(12) United States Patent
Morozumi et al.

(10) Patent No.: US 6,607,317 B2
(45) Date of Patent: Aug. 19, 2003

(54) PRINTING APPARATUS

(75) Inventors: Kazuaki Morozumi, Okaya (JP);
Kiyoshi Suyama, Matsumoto (JP);
Nobutoshi Otsuka, Hotaka-machi (JP);
Atsushi Yamazaki,
Shimachi-Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/045,950

(22) Filed: Jan. 10, 2002

(65) Prior Publication Data

US 2002/0114652 A1 Aug. 22, 2002

(30) Foreign Application Priority Data

Jan. 22, 2001 (JP) ........................................ 2001-013697

(51) Int. Cl.$^7$ .................................................. B41J 3/54
(52) U.S. Cl. .............................. 400/82; 400/61; 400/70; 400/76
(58) Field of Search ............................. 400/82, 61, 70, 400/76

(56) References Cited

U.S. PATENT DOCUMENTS

| | | | |
|---|---|---|---|
| 5,861,899 A | | 1/1999 | Nguyen et al. |
| 6,244,688 B1 | * | 6/2001 | Hickman ..................... 347/15 |
| 6,338,543 B1 | * | 1/2002 | Lindenfelser ................ 347/20 |
| 6,350,013 B1 | * | 2/2002 | Scheffelin et al. ............ 347/42 |
| 6,406,127 B1 | * | 6/2002 | Mandel ........................ 347/16 |
| 6,450,614 B1 | * | 9/2002 | Scheffelin et al. ............ 347/13 |

FOREIGN PATENT DOCUMENTS

| | | |
|---|---|---|
| EP | 0-633139 | 1/1995 |
| EP | 0-830948 | 3/1998 |
| JP | 07-040551 | 2/1995 |
| JP | 11-320828 | 11/1999 |

* cited by examiner

Primary Examiner—Charles H. Nolan, Jr.
(74) Attorney, Agent, or Firm—Hogan & Hartson LLP

(57) ABSTRACT

There is provided a printing apparatus which is capable of increasing the printing speed by employing a multi-head structure while maintaining or enhancing print quality. The printing apparatus prints on a print medium by using N print heads, where N is an integer equal to or larger than 2, assuming that two axes orthogonal to each other on a two-dimensional rectangular coordinate system are set to an X axis and a Y axis, each of the print heads being capable of printing M dots in a direction along the Y axis simultaneously, where M is an integer equal to or larger than 3, and at the same capable of printing M dot lines each extending in a direction along the X axis, by relative scan on the print medium in the direction along the X axis, the M dot lines being arranged side by side in the direction along the Y axis. At least two print heads of the N print heads are arranged in a manner such that selected ones of the M dot lines that can be printed by one of the at least two print heads overlap selected ones of the M dot lines that can be printed by another of the at least two print heads.

16 Claims, 13 Drawing Sheets

F I G. 1
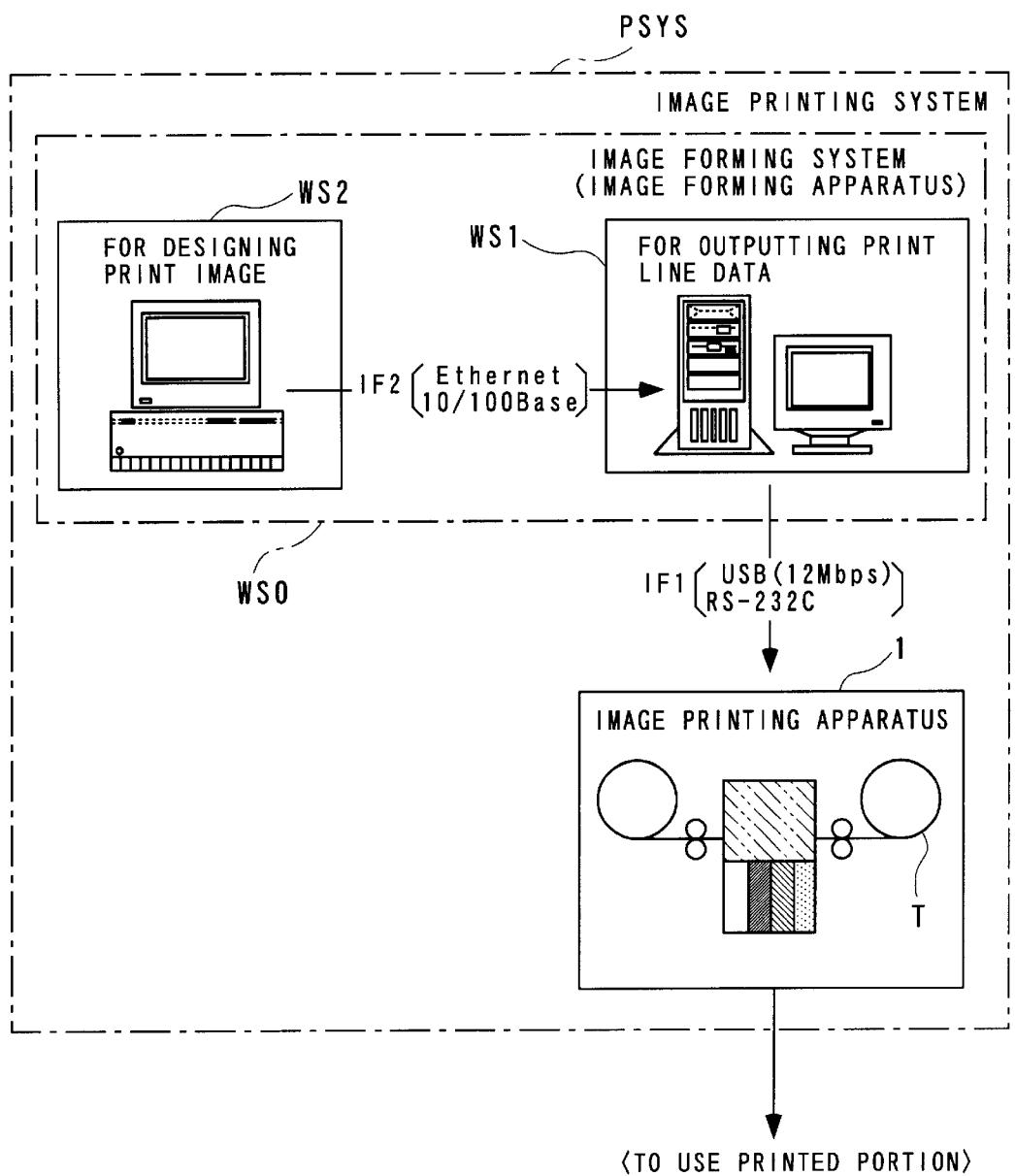

F I G. 3
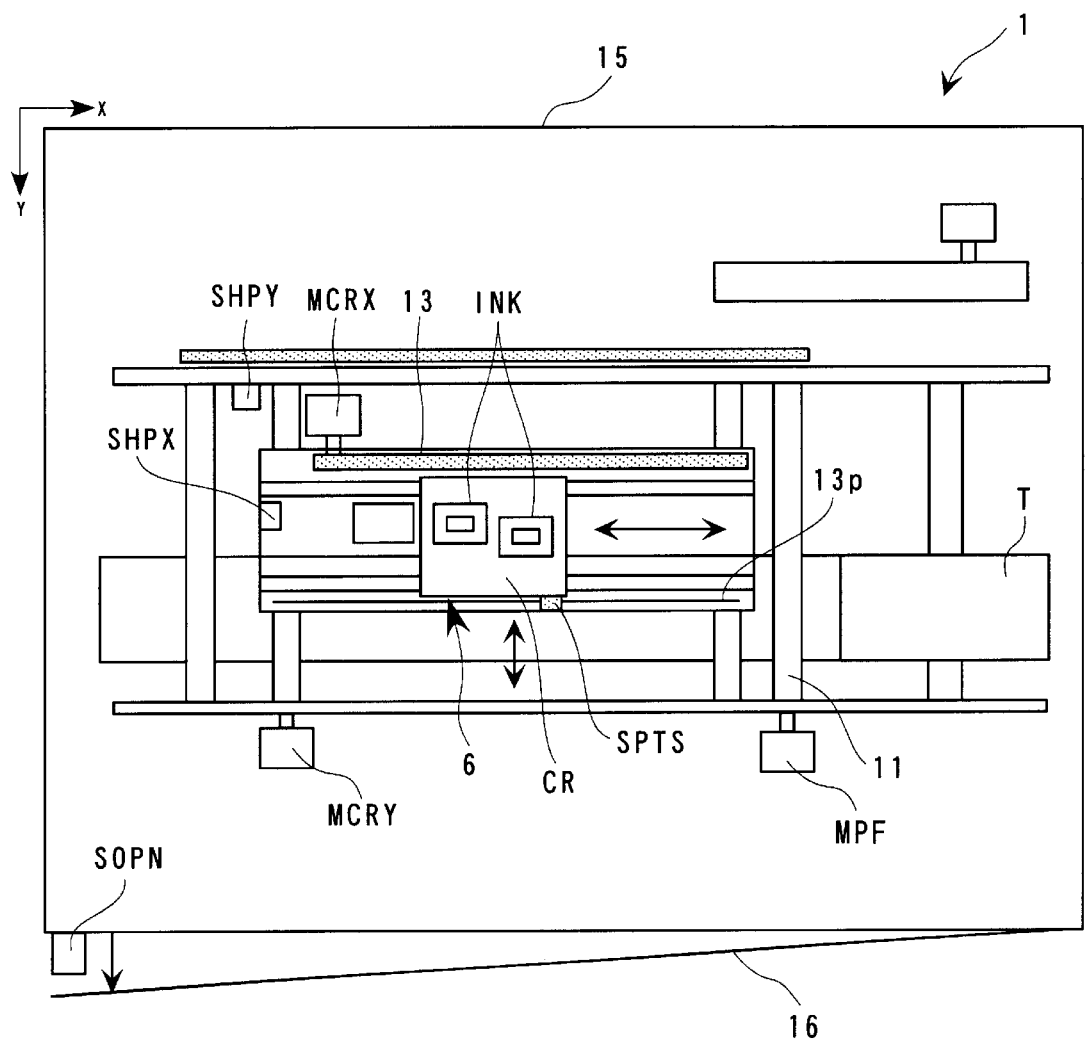

F I G. 1 0 A 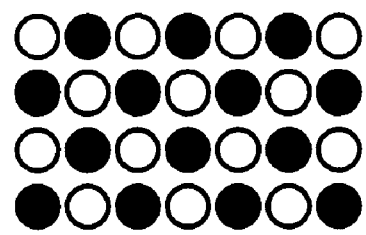
F I G. 1 0 B 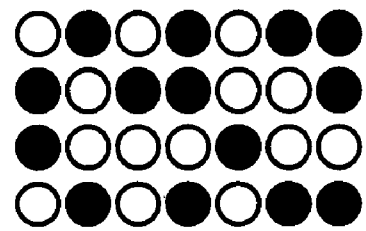

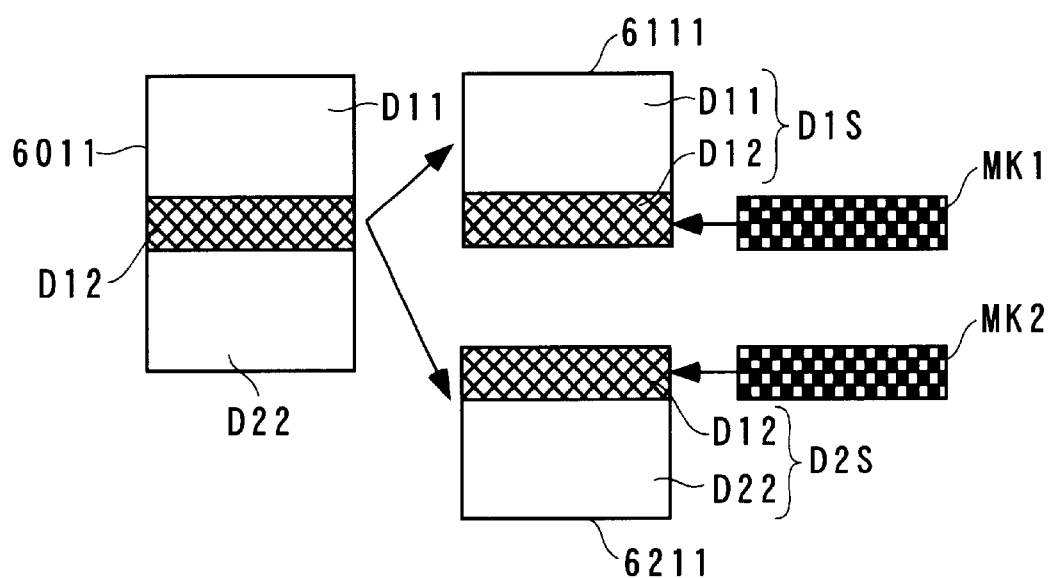
F I G. 1 1 A     F I G. 1 1 B

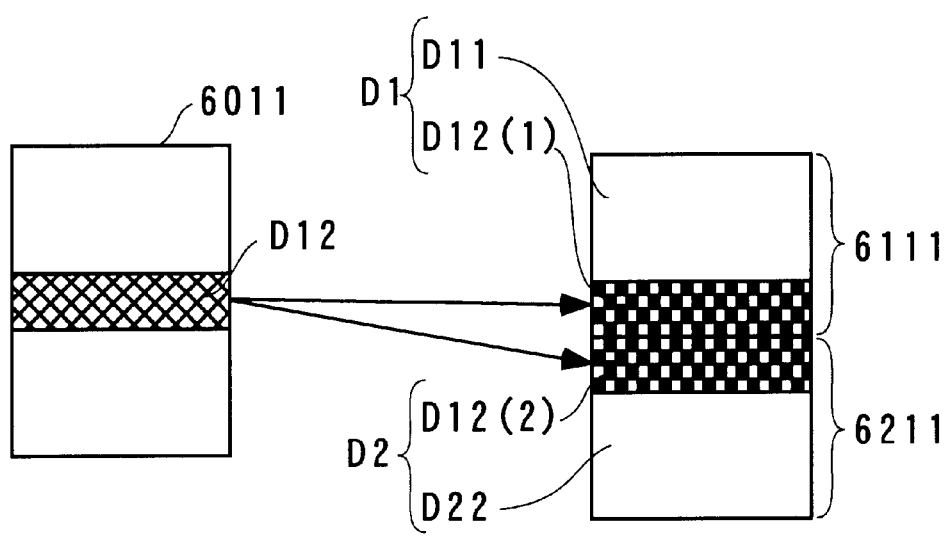
F I G. 1 2 A   F I G. 1 2 B

F I G. 1 3
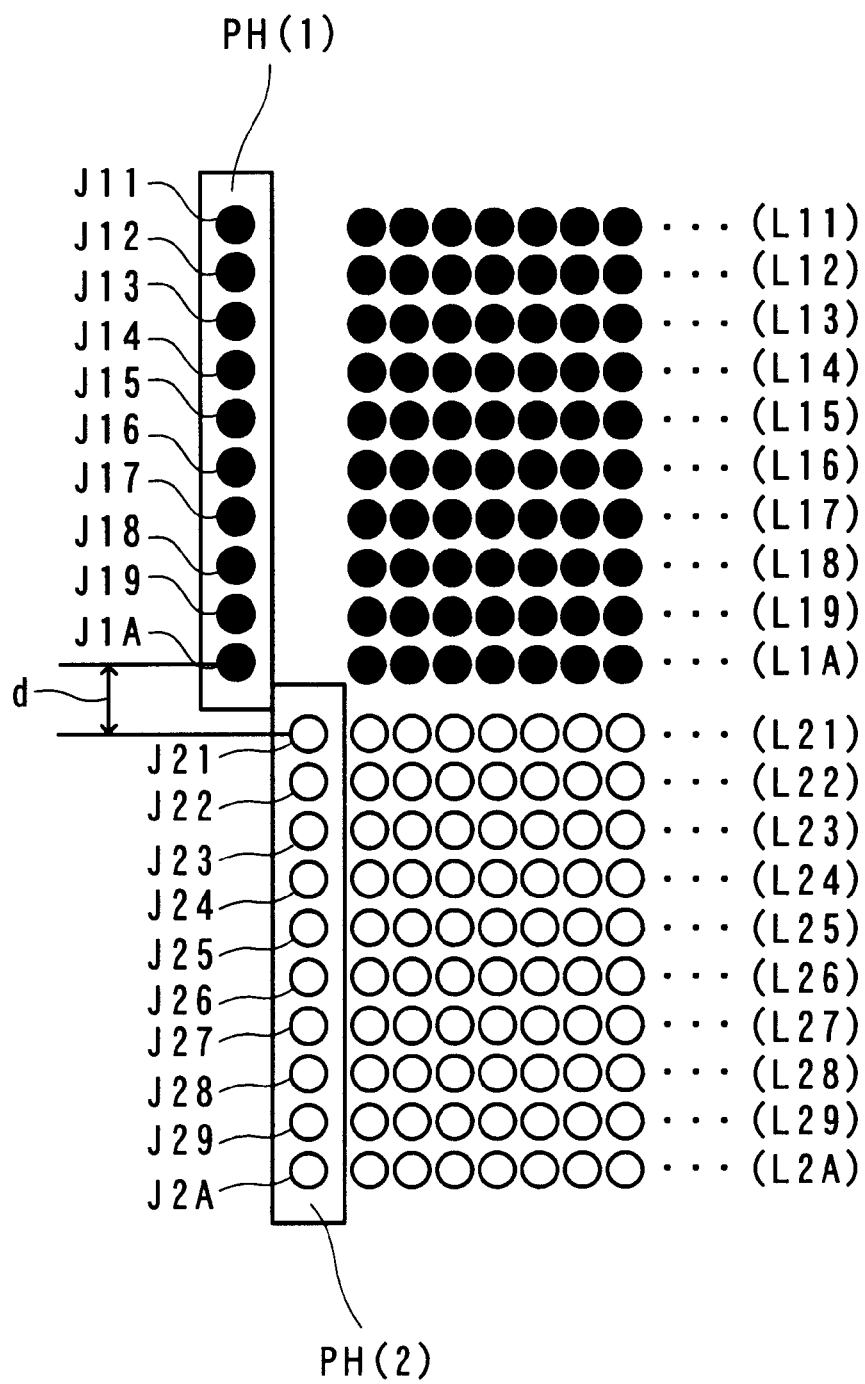

PRINTING APPARATUS

BACKGROUND OF THE INVENTION

1. Field of the Invention

This invention relates to a printing apparatus.

2. Prior Art

There has been a demand for a printing apparatus capable of printing a large-sized or a large-volume image (including an image having a large number of dots due to high density of the image) at a higher speed. In the case of a printing apparatus whose print head is caused to scan a print medium for printing, a possible solution to an increased printing speed is to increase the scanning speed or increase a printable quantity per scan. The former has limits in accuracy of driving and braking control for scanning, and resulting accuracy of positioning control. On the other hand, the latter is capable of increasing the printable quantity per scan, in theory, by using a plurality of print heads (so-called multi-head).

For instance, as shown in FIG. 13, by using N print heads, PH(1), PH(2) where N is an integer equal to or lager than 2 (in the illustrated example, N=2), a larger number of lines of dots (hereinafter referred to as "dot lines") can be printed per scan. In the illustrated example, the two print heads PH(1) and PH(2) each have M nozzles in the case of an ink jet type, or M thermal heads (heating elements) in the case of a thermal transfer type. In the following, the nozzles and thermal heads of the two types of print heads are generically referred to as nozzles. The print head PH(1) has 10 (=M) nozzles J11, J12, . . . , J19, and J1A, while the print head PH(2) has 10 (=M) nozzles J21 to J2A. That is, by using two (=N) print heads each of which can print 10 (=N) dot lines per scan, it is possible in theory to print 20 (M×N) dot lines per scan.

However, in arranging the print heads PH(1) and PH(2) as shown in FIG. 12, the accuracy of the distance indicated by d in the figure causes a problem. It is possible to manufacture a print head such that the distance between the nozzle J11 and the nozzle J12, for instance, is equal to or shorter than 10 μm, but it is practically impossible to arrange the print heads such that the distance d between the nozzle J1A at one end of the print head PH(1) and the nozzle J21 at an opposed end of the print head PH(2) is equal to or shorter than 10 μm. Further, even if the arrangement may be possible, for the time being, a dimensional error occurs due to changes in temperatures of the print heads themselves. As a result, due to lowered accuracy of the inter-nozzle arrangement, a dot line L1A printed by the nozzle J1A and a dot line J21 printed by the nozzle J21 can appear to have a blank line between them differently from boundaries between other dot lines, causing a noticeably degraded print image quality. In short, due to a low inter-nozzle position accuracy, the print quality is degraded.

SUMMARY OF THE INVENTION

It is an object of the invention to provide a printing apparatus which is capable of increasing the printing speed by employing a multi-head structure and at the same time maintaining or enhancing print quality.

To attain the above object, the present invention provides a printing apparatus for printing on a print medium by using N print heads, where N is an integer equal to or larger than 2, assuming that two axes orthogonal to each other on a two-dimensional rectangular coordinate system are set to an X axis and a Y axis, each of the print heads being capable of printing M dots in a direction along the Y axis simultaneously, where M is an integer equal to or larger than 3, and at the same capable of printing M dot lines each extending in a direction along the X axis, by relative scan on the print medium in the direction along the X axis, the M dot lines being arranged side by side in the direction along the Y axis.

The printing apparatus according to the invention is characterized in that at least two print heads of the N print heads are arranged in a manner such that selected ones of the M dot lines that can be printed by one of the at least two print heads overlap selected ones of the M dot lines that can be printed by another of the at least two print heads.

According to this printing apparatus, there is employed a multi-head structure which uses N print heads each capable of printing M dots or M dot lines in a manner juxtaposed in a direction along the Y axis. Therefore, it is possible to increase the printing speed. Further, at least two print heads of the N print heads are arranged in a manner such that selected ones of the M dot lines that can be printed by one of the at least two print heads overlap selected ones of the M dot lines that can be printed by another of the at least two print heads. Therefore, it is possible to prevent degradation of print quality, caused e.g. by blank lines appearing between dot lines printed by the at least two print heads. That is, part of the dot lines which can cause the problem of degraded print quality can be printed by the at least two print heads in an overlapping manner, so that the print quality can be maintained or enhanced without demanding practically impossible positioning accuracy of the print heads. Therefore, it is possible to increase the printing speed by employing the multi-head structure, and at the same time maintain or enhance the print quality.

Preferably, the at least two print heads are arranged in a manner such that L dot lines of the M dot lines that can be printed by one of the at least two print heads overlap L dot lines of the M dot lines that can be printed by another of the at least two print heads, where L is a natural number satisfying the relationship of L<M.

According to this preferred embodiment, the at least two print heads are arranged in a manner such that L dot lines of the M dot lines that can be printed by one of the at least two print heads overlap L dot lines of the M dot lines that can be printed by another of the at least two print heads, where L is a natural number satisfying the relationship of L<M.

Therefore, dot lines to be printed by the at least two print heads are 2×M−L dot lines and hence an increase in the printing speed is lowered by a degree corresponding to the L dot lines, i.e. the number of dot lines to be printed per scan is decreased thereby. However, it is possible to prevent degradation of print quality, caused e.g. by blank lines appearing between dot lines printed by the at least two print heads. That is, the L dot lines which cause the problem of degraded print quality can be printed by the at least two print heads in an overlapping manner, so that the print quality can be maintained or enhanced without demanding practically impossible positioning accuracy of the print heads. Therefore, it is possible to increase the printing speed by employing the multi-head structure, and at the same time maintain or enhance the print quality.

Alternatively, the at least two print heads are arranged in a manner such that L+2J dot lines of the M dot lines that can be printed by one of the at least two print heads overlap L+2J dot lines of the M dot lines that can be printed by another of the at least two print heads, where L is a natural number satisfying the relationship of $L \leq M-2J$, and J is a natural number satisfying the relationship of $J<M/2$, and each of the at least two print heads is inhibited from printing J dot lines at a counterpart print head side end.

According to this preferred embodiment, the at least two print heads are arranged in a manner such that L+2J dot lines of the M dot lines that can be printed by one of the at least two print heads overlap L+2J dot lines of the M dot lines that can be printed by another of the at least two print heads, where L is a natural number satisfying the relationship of $L \leq M-2J$, and J is a natural number satisfying the relationship of $J<M/2$. Therefore, if the dot lines are printed in this state, the L+2J dot lines can be printed in an overlapping manner. In this preferred embodiment, however, each of the at least two print heads is inhibited from printing J dot lines at an counterpart print head side end. This makes it possible to prevent degradation of print quality due to manufacturing errors of opposed ends of the print heads.

Alternatively, the at least two print heads are arranged in a manner such that L+J dot lines of the M dot lines that can be printed by one of the at least two print heads overlap L+J dot lines of the M dot lines that can be printed by another of the at least two print heads, where L is a natural number satisfying the relationship of $L \leq M-J$, and J is a natural number satisfying the relationship of $J<M$, and the one of the at least two N print heads is inhibited from printing J dot lines at a counterpart print head side end.

According to this print head, the at least two print heads are arranged in a manner such that L+J dot lines of the M dot lines that can be printed by one of the at least two print heads overlap L+J dot lines of the M dot lines that can be printed by another of the at least two print heads, where L is a natural number satisfying the relationship of $L \leq M-J$, and J is a natural number satisfying the relationship of $J<M$. Therefore, if the dot lines are printed in this state, the L+J dot lines can be printed in an overlapping manner. In this preferred embodiment, however, the one of the at least two N print heads is inhibited from printing J dot lines at an counterpart print head side end. This makes it possible to prevent degradation of print quality e.g. due to manufacturing errors of an end of the one of the print heads.

More preferably, the at least two print heads alternatively print each of dots of the L dot lines each extending along the X axis.

According to this preferred embodiment, the at least two print heads alternatively print each of dots of the L dot lines each extending along the X axis. Therefore, the L dot lines can be printed in an overlapping manner while causing each dot of the L dot lines to be alternatively printed by either of the at least two print heads.

Further preferably, the at least two print heads print the dots of the L dot lines in a predetermined order.

According to this preferred embodiment, the at least two print heads print the dots of the L dot lines in a predetermined order. Therefore, it is possible to print the dots of the L dot lines in an orderly overlapping manner.

Still more preferably, the at least two print heads alternately print each of the dots of the L dot lines.

According to this preferred embodiment, it is possible to print the L dot lines in an overlapping manner by causing the at least two print heads to alternately print each of the dots of the L dot lines, the dots being aligned in the direction along the X axis.

Still further preferably, the L is a plural number, and each of the at least two print heads print the dots of the L dot lines in a staggered arrangement.

According to this preferred embodiment, the L is a plural number, and by causing each of the two print heads to alternately print each of the dots of the L dot lines extending along the X axis, the dots of the L dot lines can be printed in an staggered arrangement to print the L dot lines in an overlapping manner.

Further preferably, the at least two print heads print the dots of the L dot lines in a random order.

According to this preferred embodiment, the at least two print heads print the dots of the L dot lines extending along the X axis in a random order. Therefore, it is possible to print the dots of the L dot lines in an overlapping manner such that the order of printing of each dot by either of the two print heads is random. This makes it possible to prevent the merging portion of respective sets of dot lines printed by the print heads from forming an orderly pattern, thereby further enhancing print quality.

Further preferably, the at least two print heads perform printing based on print data representing the M dot lines to be printed thereby, and each item of the print data based on which a corresponding one of the at least two print heads performs printing contains information concerning each dot as to whether the dot should be printed by the corresponding one of the at least two print heads.

According to this preferred embodiment, the at least two print heads print each perform printing based on print data representing the M dot lines to be printed thereby. In this case, each item of the print data based on which a corresponding one of the at least two print heads performs printing contains information concerning each dot as to whether the dot should be printed by the corresponding one of the print heads. Therefore, by simply performing printing according to the print data, it is possible to properly print the dots to be printed by the at least two print heads.

Still more preferably, the at least two print heads comprise a first print head and a second print head, and the printing apparatus further comprises allocation pattern-determining means for determining an allocation pattern which defines a manner of allocation of the dots of the L dot lines to the at least two print heads by a pattern, first print data-storing means for storing first print data representing M dot lines to be printed by the first print head, based on the allocation pattern, and second print data-storing means for storing second print data representing M dot lines to be printed by the second print head, based on the allocation pattern.

According to this print head, an allocation pattern is determined which defines a manner of allocation of the dots of the L dot lines to the at least two print heads by a pattern, and first print data representing M dot lines to be printed by the first print head and second print data M dot lines to be printed by the second print head are stored based on the allocation pattern. Therefore, the first print head and the second print head can print dots to be printed thereby simply by performing printing according to the first print data and the second print data, respectively.

Still further preferably, the first print data-storing means comprises pseudo first print data-storing means for storing pseudo first print data representing M dot lines to be printed by the first print head assuming the L dot lines to be printed by the first print head do not overlap the L dot lines to be printed by the second print head, first mask pattern-forming means for forming a first mask pattern indicative of part to be printed by the first print head based on the allocation pattern, and first print data-forming means for converting the pseudo first print data to the first print data by carrying out masking of data of the L dot lines out of the pseudo first print data based on the first mask pattern.

According to this preferred embodiment, pseudo first print data representing M dot lines to be printed by the first print head assuming that the L dot lines to be printed by the first print head do not overlap the L dot lines to be printed by the second print head is stored, and a first mask pattern indicative of part to be printed by the first print head is formed based on the allocation pattern. Then, the pseudo first print data is converted to the first print data by carrying out masking of data of the L dot lines out of the pseudo first print data based on the first mask pattern. That is, the pseudo first print data is converted to the first print data by using the first mask pattern based on the allocation pattern. Therefore, e.g. by once storing the pseudo first print data, and then performing data conversion after determining a print head to which each dot is to be allocated, it is possible to easily form the first print data. The second print data for the second print head can be similarly prepared.

Still further preferably, the first print data-storing means comprises first individual print data-storing means for storing first individual print data representing, out of the M dot lines to be printed by the first print head, M–L dot lines which dot not overlap the L dot lines to be printed by the second print head, first common print data-storing means for storing first common print data representing, out of the M dot lines to be printed by the first print head, the L dot lines which overlap the L dot lines to be printed by the second print head, and the second print data-storing means comprises second individual print data-storing means for storing second individual print data representing, out of the M dot lines to be printed by the second print head, M–L dot lines which dot not overlap the L dot lines to be printed by the first print head, second common print data-storing means for storing second common print data representing, out of the M dot lines to be printed by the second print head, the L dot lines which overlap the L dot lines to be printed by the first print head, the printing apparatus further comprising basic common print data-storing means for storing basic common print data representing the L dot lines in which the allocation of the dots of the L dot lines to the first print head and the second print head has not been reflected, and common print data-allocation means for allocating the basic common print data to the first common print data and the second common print data based on the allocation pattern.

According to this printing apparatus, there are stored first individual print data representing, out of the M dot lines to be printed by the first print head, M–L dot lines which dot not overlap the L dot lines to be printed by the second print head, and first common print data representing, out of the M dot lines to be printed by the first print head, the L dot lines which overlap the L dot lines to be printed by the second print head, second individual print data representing, out of the M dot lines to be printed by the second print head, M–L dot lines which dot not overlap the L dot lines to be printed by the first print head, and second common print data representing, out of the M dot lines to be printed by the second print head, the L dot lines which overlap the L dot lines to be printed by the first print head. In this case, basic common print data representing the L dot lines in which the allocation of the dots of the L dot lines to the first print head and the second print head has not been reflected is allocated to the first common print data and the second common print data based on the allocation pattern. Therefore, by adding the first individual print data and the second individual print data to the first common print data and the second common print data, respectively, it is possible to easily form the first print data and the second print data.

Preferably, the N print heads are each formed by an ink jet print head having at least M nozzles each for ejecting ink, the ink jet print head being capable of printing the M dots simultaneously by ink ejected from the M nozzles.

According to this preferred embodiment, the N print heads are each formed by an ink jet print head capable of printing M dots simultaneously by ink ejected from its M nozzles. Therefore, the present invention can be applied to a printing apparatus of ink jet type.

Preferably, the printing apparatus includes print image data-storing means for storing print image data representing a print image to be printed on the print medium, and the print image data contains binary data representing execution and inhibition of printing of each dot by binary expression.

According to this preferred embodiment, print image data representing a print image to be printed on the print medium is stored, and the print image data contains binary data representing execution and inhibition of printing of each dot by binary expression. Therefore, by allocating the print image data to the N print heads, each print head can easily print a portion to be printed thereby.

More preferably, the print image is a color image, and the print image data contains binary data representing each color of the color image.

According to this preferred embodiment, the print image is a color image, and the print image data contains binary data representing each color of the color image. Therefore, even though the print image is a color image, it is possible to cause each print head to print dots to be printed thereby, only by allocating the dots to the N print heads.

Preferably, the print medium is in a continuous form, and mounted in the printing apparatus such that a direction along length of the print medium coincides with the direction along the X axis.

According to this preferred embodiment, the print medium is in a continuous form, and mounted in the printing apparatus such that a direction along length of the print medium coincides with the direction along the X axis. Therefore, it is possible to increase an amount to be printed per scan, thereby further increasing the printing speed.

The above and other objects, features, and advantages of the invention will become more apparent from the following detailed description taken in conjunction with the accompanying drawings.

BRIEF DESCRIPTION OF THE DRAWINGS

FIG. 1 is an explanatory view schematically showing the arrangement of an image printing system to which is applied a printing apparatus according to an embodiment of the invention;

FIG. 3 is an explanatory view showing a schematic horizontal cross section of the mechanical system;

FIGS. 10A and 10B are explanatory views showing respective examples of dot lines printed in an overlapping manner by the two print heads;

FIGS. 11A and 11B are explanatory views showing a method of determining respective portions of an overlapping portion allocated to the respective print heads, by making use of mask patterns;

FIGS. 12A and 12B are explanatory views showing images of an overlapping portion before and after allocating respective portions of the overlapping portion to the print heads; and FIG. 13 is an explanatory view schematically showing a problem caused when the multi-head structure is employed.

DETAILED DESCRIPTION OF PREFERRED EMBODIMENT

The invention will now be described in detail with reference to the drawings showing an embodiment thereof. In the embodiment, a printing apparatus according to the invention is applied to an image printing system.

Referring first to FIG. 1, the image printing system PSYS includes am image forming system (or apparatus) WS0 including a personal computer, an engineering work station (EWS) or the like for forming print image data representing a desired print image, and the image printing apparatus 1 for printing a print image based on the print image data. The print image data formed by the image forming system WS0 is transferred (sent) to the image printing apparatus 1 via a first interface IF1 in units of line data items each representing one line of the print image data.

Figure 2:
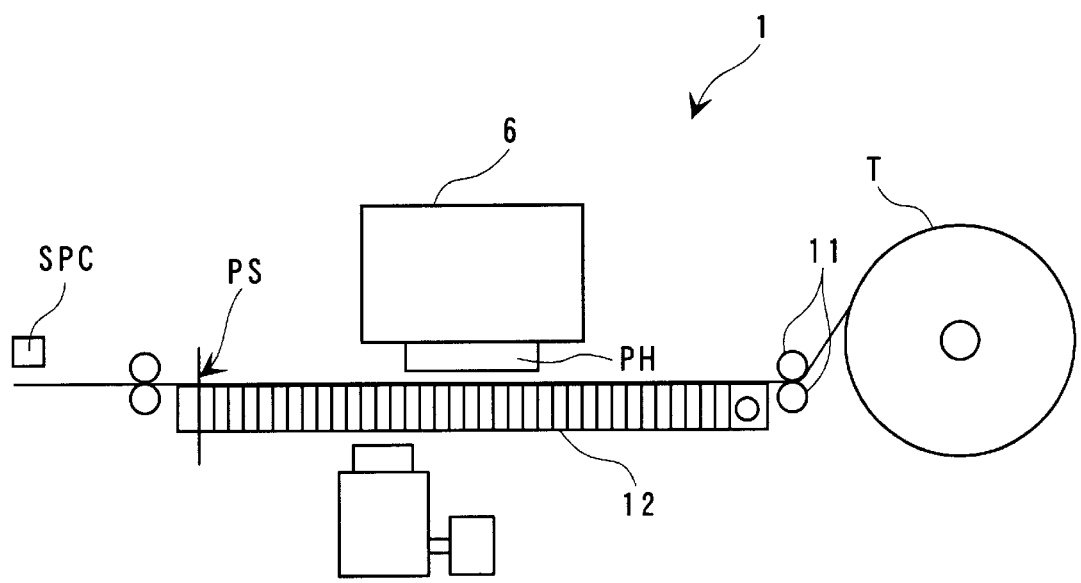
FIG. 2 is an explanatory view showing a schematic vertical cross section of a mechanical system of an image printing apparatus appearing in FIG. 1.

Next, as shown in FIGS. 1 to 3, in the image printing apparatus 1, a tape T supplied (mounted) in a state wound around a tape reel (on a right-hand side as viewed in the figures) is used as a print medium. A PF roller 11 driven by a paper field (PF) motor MPF rolls out the tape T to an attraction unit 12 which is used as a work area for printing operation, and a print head group (ink jet head group) PH (detailed description will be given with reference to FIG. 6) carried on a head unit 6 prints on the tape T as desired. The printed portion of the tape T is sequentially delivered out of the image printing apparatus 1 (in a leftward direction as viewed in FIG. 2). The attraction unit 12 is configured such that during the printing operation, it holds the tape T in a predetermined printing position by using a fan, not shown. The tape T includes a type, such as an ordinary paper tape, which has no adhesive surface on the reverse side thereof, and a type which has an adhesive surface formed on the reverse side thereof with a peel-off paper covering the adhesive surface. It should be noted that as shown in FIG. 3, the following description will be given assuming that the direction of the length of the tape T is set to the direction along the X axis (hereinafter referred to as "the X-axis direction") or a main scanning direction, and a direction orthogonal to the direction of the length of the tape T is set to the direction along the Y axis (hereinafter referred to as "the Y-axis direction") or as a sub scanning direction.

The head unit 6 includes a carriage CR carried on a main scanning unit 13, an ink cartridge INK removably mounted in the carriage CR to hold inks of six colors (black (K), yellow (Y), magenta (M), cyan (C), light magenta (LM), and light cyan (LC)), and the print head group PH which is installed on a lower portion of the carriage CR such that it can be opposed to the tape T. The main scanning unit 13 is driven by a sub scanning carriage motor MCRY such that it can move above the top of the attraction unit 12 in the sub scanning direction (Y-axis direction). Further, the carriage CR is driven by a main scanning carriage motor MCRX such that it can move in the main scanning direction (X-axis direction). Thus, the head unit 6 (having the print head group PH) can move above the top of the attraction unit 12 (i.e. the top of the work area for printing operation).

In this embodiment, a position in a printable area (workable area) located downstream of the tape T (on a left-hand side as viewed in the figures, i.e. on a side where the coordinate value "X" is small) and on a rear side (on a rear side in FIG. 2, at an upper left location in FIG. 3, i.e. on a side where the coordinate value "Y" is small) of the image printing apparatus 1, is set to a print-starting position PS. A main scanning home position sensor SHPX for sensing a home position of the head unit 6 for the main scanning (X side) is arranged on the carriage CR, and a sub scanning home position sensor SHPY for sensing a home position of the head unit 6 for the sub scanning (Y side) is arranged at a location shown in FIG. 3 (inside a casing, where an upper end of the carriage CR can be sensed).

On the main scanning unit 13, a predetermined (e.g. monochrome) pattern image 13p is arranged such that it can be sensed optically. At a location on the carriage CR, opposite to the pattern image 13p, there is arranged a print timing sensor SPTS which detects the position of the carriage CR by itself by sensing the pattern of the pattern image 13p, for recognition of print timing. As shown in FIG. 3, the above-mentioned component parts of the image printing apparatus 1 are accommodated in a protective casing 15. It should be noted that in addition to the sensors described above, there are provided, for instance, a protective casing opening/closing sensor SOPN which detects the opening and closing of a lid 16 of the protective casing 15 and performs an emergency stop if it is detected that the lid 16 is opened during the operation, and a paper position sensor SPC for sensing the leading edge of the tape T.

Figure 4:
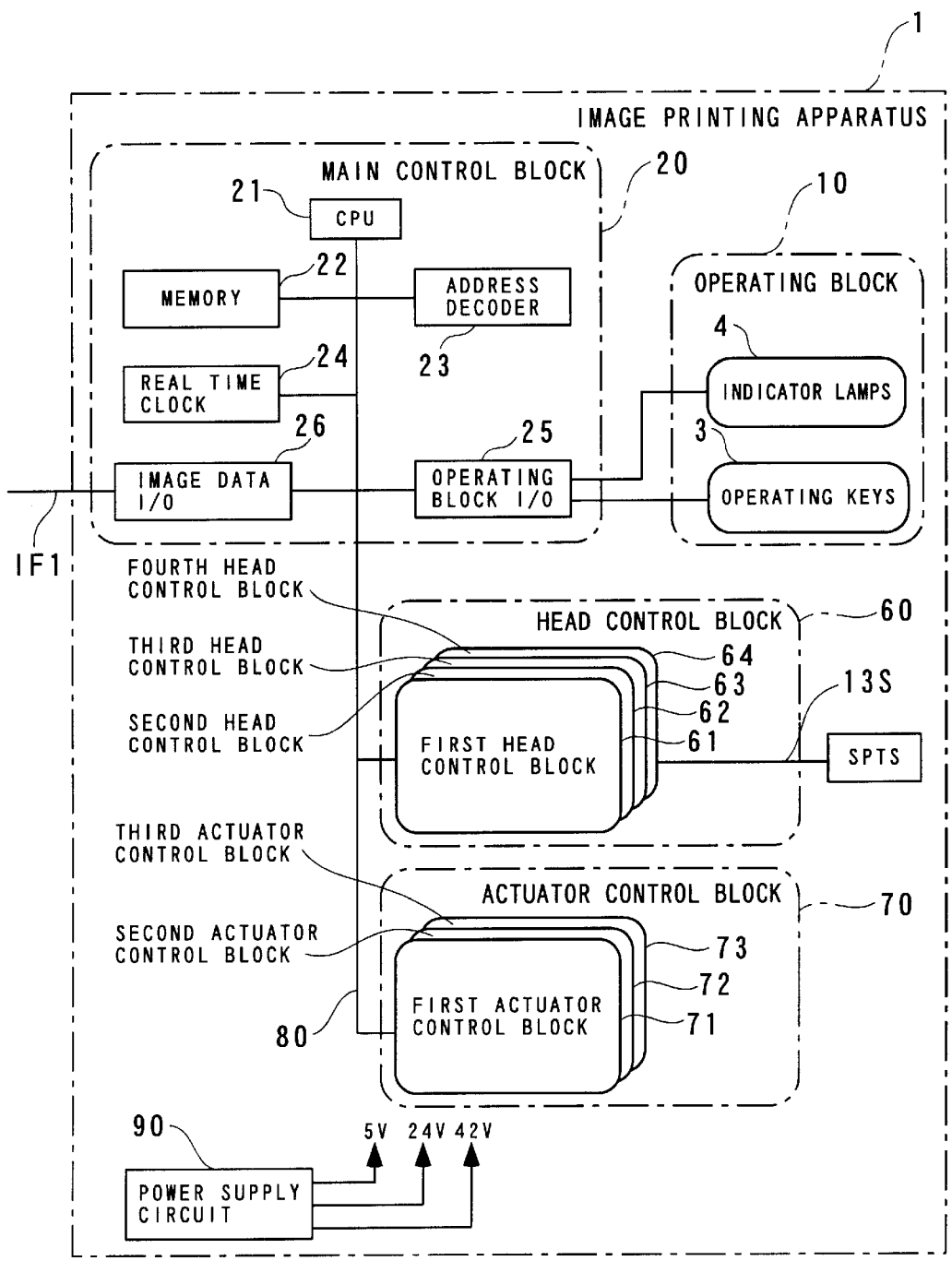
FIG. 4 is a block diagram schematically showing the arrangement of a control system of the image printing apparatus.

Next, the arrangement of the control system of the image printing apparatus 1 will be described. As shown in FIG. 4, the control system of the image printing apparatus includes an operating block 10 having indicator lamps 4 and operating keys 3 for interfacing with the user (man machine), a head control block 60 for controlling the print head 6 and component parts associated therewith, an actuator control block 70 for controlling actuators associated with the respective motors, a power supply circuit 90 for supplying power to each block, and a main control block 20 which serves as a center for controlling the blocks of the image printing apparatus 1.

The main control block 20 includes a CPU 21, a memory 22, an address decoder 23, and a real time clock 24, as well as an operating block input/output (operating block I/O) 25 for interfacing with the operating block 10, an image data input/output (image data I/O) 26 for communication with the above-mentioned image forming system WSO via the first interface IF1 described above, all of which are connected to each other by an internal bus (CPU bus) 80 commonly used in the image printing apparatus 1. The head control block 60 includes first to fourth head control blocks 61 to 64. Although similarly to the head control block 60, the actuator control block 70 as well has a plurality of control blocks 71 to 73, detailed description thereof is omitted here.

Figure 5:
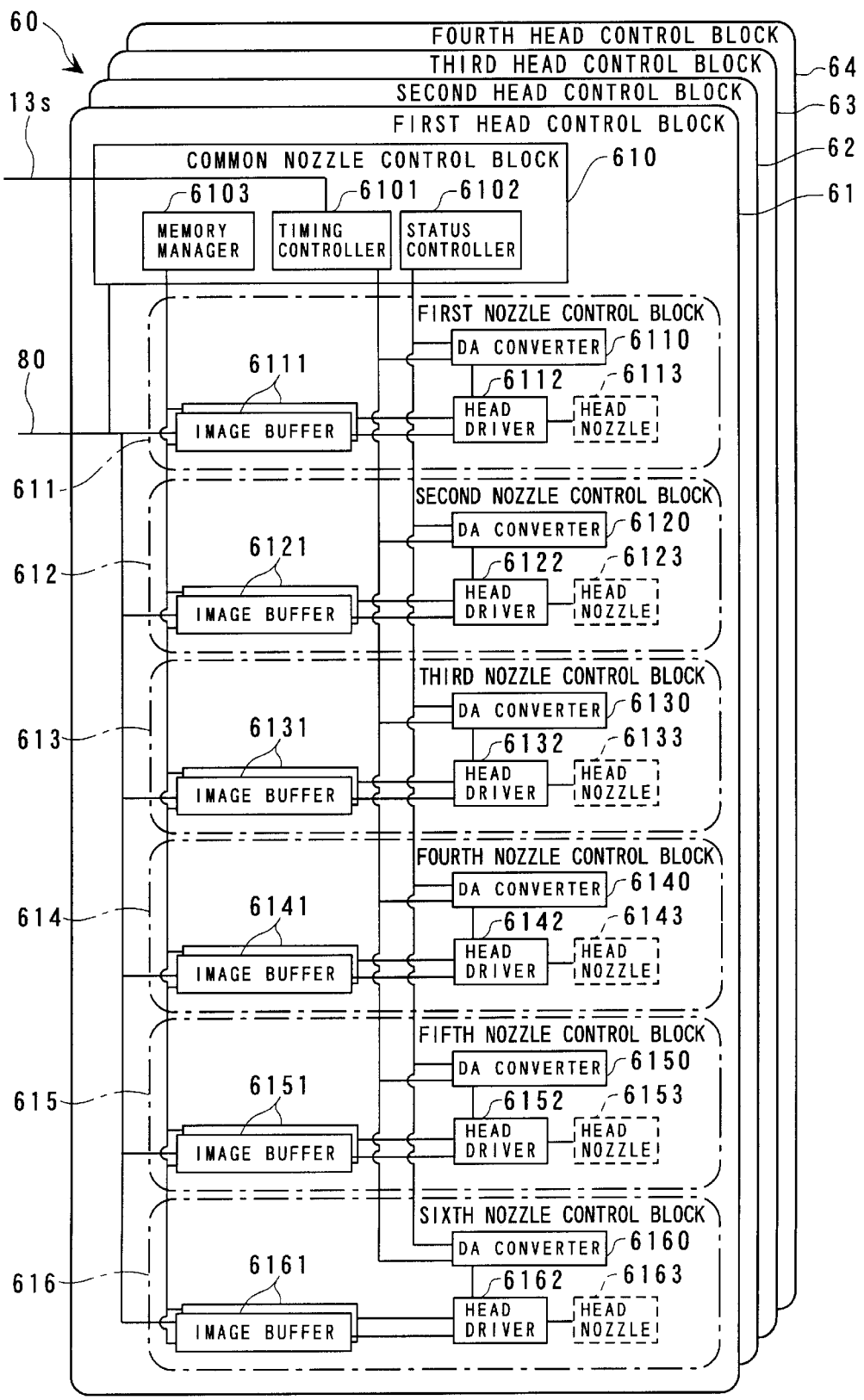
FIG. 5 is a block diagram schematically showing the arrangement of a head control block appearing in FIG. 4.

Referring to FIGS. 4 and 5, the first head control block 61 of the head control block 60 includes a common nozzle control block 610, and first to sixth nozzle control blocks 611 to 616.

The common nozzle control block 610 includes a timing controller 6101 which controls the timing of ejection of ink droplets from each nozzle of the print head group PH. This control of the timing of ejection of ink droplets is carried out in response to a detection signal (encoder signal) 13s indicative of the pattern of the pattern image 13p sensed by the print timing sensor SPTS. The common nozzle control block 610 also includes a status controller 6102 for controlling the state (status) of each nozzle of the print head group PH, and a memory manager (M/M) 6103 for managing buffering of data in image buffers 6111, 6121, 6131, 6141, 6151, and 6161.

The first nozzle control block 611 includes a D/A converter (DAC) 6110, an image buffer 6111, and a head driver 6112 for driving a head nozzle 6113. The DAC 6110 is used for converting control signals (digital signals) from the timing controller 6101 and the status controller 6102 to the control waveforms (analog signals) of applied voltages for driving the head driver 6112 (for piezoelectric ejection). The other nozzle control blocks 612 to 616 as well are configured similarly to the first nozzle control block 611. Further, the other head control blocks 62 to 64 as well are constructed similarly to the first head control block 61.

Figure 6A:
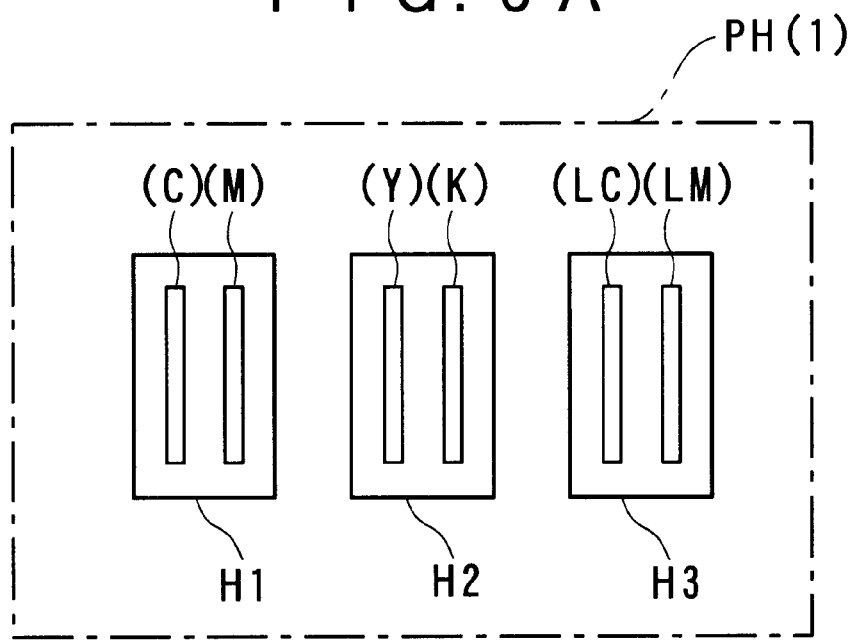
FIGS. 6A and 6B are views which are useful in explaining the function and arrangement of print heads and head nozzles thereof mounted in a head unit.
Figure 6B:
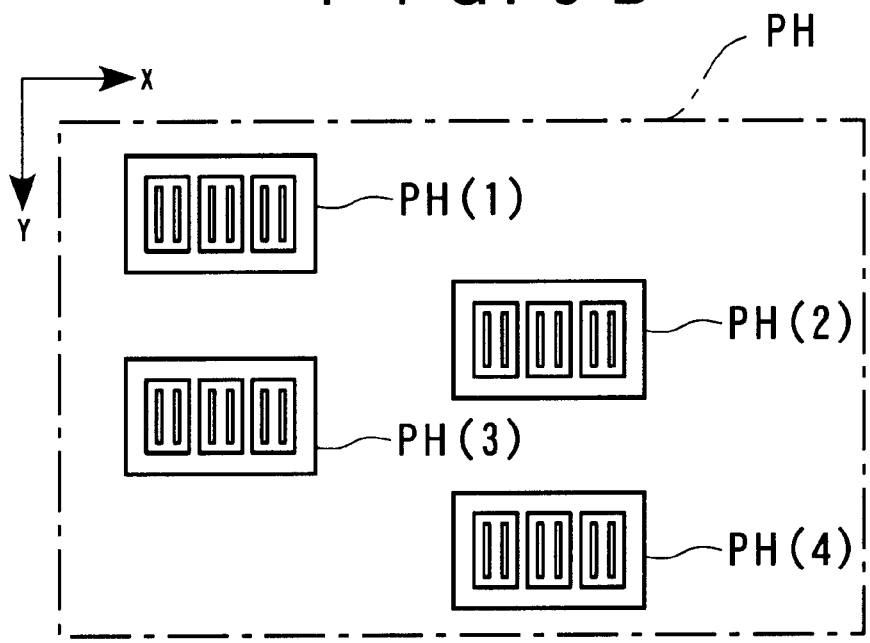

In this embodiment, six head nozzles 6113, 6123, 6133, 6143, 6153, and 6163, all of which are controlled by the first head control block 61, are nozzle arrays e.g. each comprised of 180 nozzles. Each of them is provided for ejecting an ink of one of the six colors (black (K), yellow (Y), magenta (M), cyan (C), light magenta (LM), light cyan (LC)). For instance, let it be assumed that as shown in FIG. 6A, three print heads H1 to H3 each having two nozzle arrays arranged therein are set to a print head group PH(1) for being controlled by the first head control block 61, and print head groups PH(2), PH(3), and PH(4) constructed similarly to the print head group PH(1) are for being controlled by second to fourth head control blocks 62 to 64, respectively. Then, as shown in FIG. 6B, the print head group PH in the present embodiment includes the print head groups PH(1) to PH(4), and hence configured to have 3 by 4 heads (12-head configuration).

It should be noted the print head group PH may be configured to have e.g. 3 by 6 heads (18-head configuration), or 3 by 3 heads (9-head configuration) such that the head control blocks can be changed in number according to a change in the specifications of the image printing apparatus 1. Further, in this case, the image printing apparatus 1 may be configured such that e.g. by forming each head control block by using one circuit board (head control board), the apparatus 1 can be subjected to construction modification (specification change) simply by inserting or drawing (mounting or removing) head control boards.

The image printing apparatus 1 has print head groups PH(1) to PH(4) as described hereinabove with reference to FIG. 6B. More specifically, the print head groups PH(1) to PH(4) have nozzle arrays formed by respective lines of 180 (=M) nozzles in the Y-axis direction, for each of the six colors. That is, even as to each single color, e.g. cyan (C), there are employed a so-called multi-head structure in which N (=2, in the illustrated example) print heads each capable of printing M dots, where M is an integer equal to or larger than 3 (in the illustrated example, M=180), or 180 (=M) dot lines. In the present embodiment, each print head may be implemented by one having nozzle arrays adapted to a single color.

Therefore, the present image printing apparatus can basically attain an increased printing speed. However, to this end, the printing also solves the conventional problem of degraded print quality caused by the multi-head structure, thereby making it possible to attain the increased printing speed and at the same time maintain or enhance the print quality. Now, the description will be given concerning the solution of the conventional problem.

For the purpose of simplified description using a schematic figure, it is assumed here that two print head groups PH(1), PH(2) represent the four (=N) print head groups, and a nozzle array of one color (e.g. cyan (C)) represents six nozzle arrays (each formed of 180 nozzles) of respective six colors of each of the print head groups PH(1), PH(2), and further that the number (M=180) of nozzles is also reduced to 10 (=M) for simplicity. Thus, in the following explanation, the print heads PH(1), PH(2) are assumed to be constituted by respective two nozzle arrays each formed to have ten nozzles.

Figure 7:
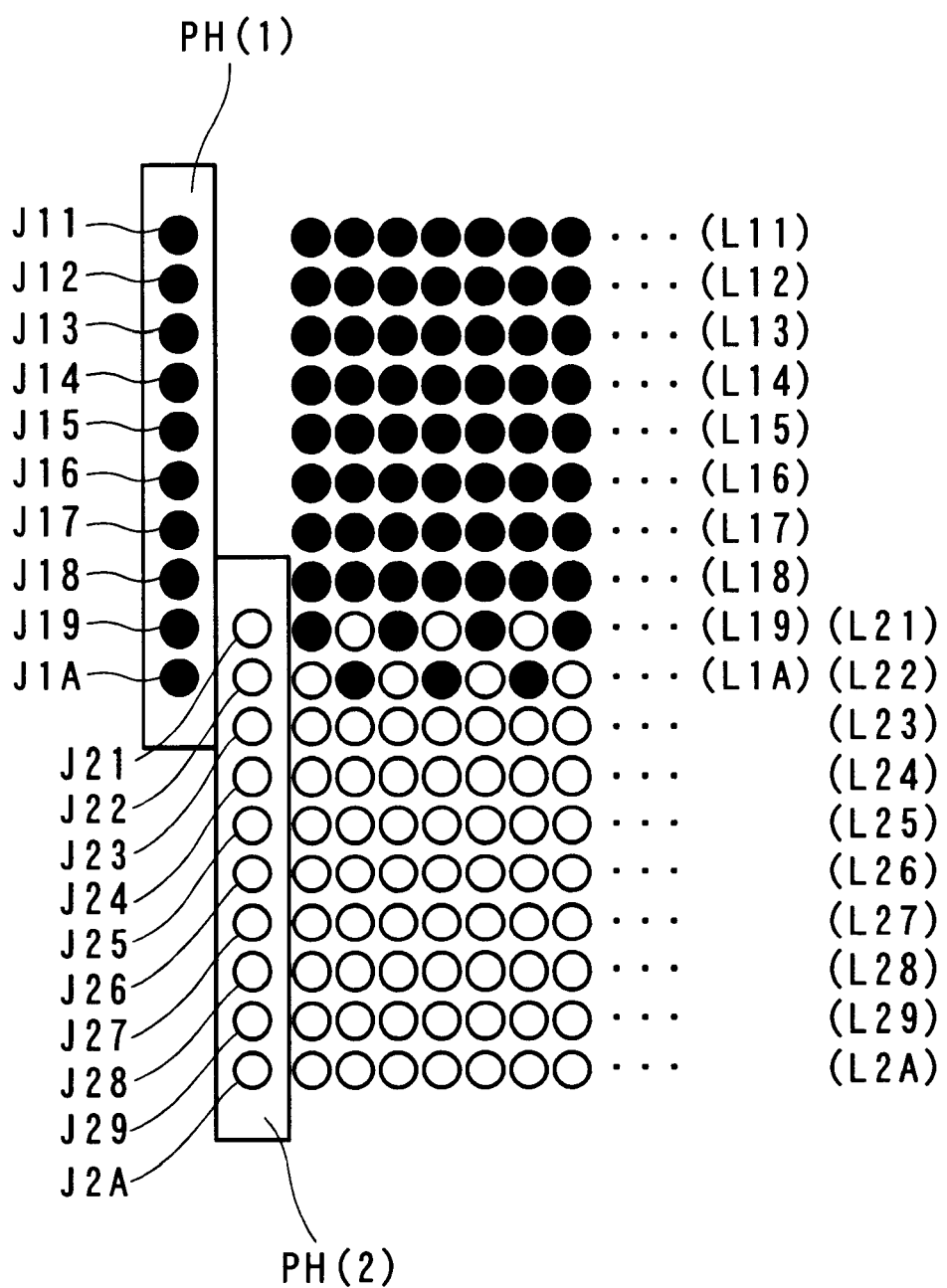
FIG. 7 is an explanatory view schematically showing two print heads and an example of dot lines to be printed thereby in an overlapping manner when the multi-head structure is employed.

For instance, as shown in FIG. 7, the print head PH(1) has M nozzles J11, J12, . . . , J19, J1A (M=10 in the illustrated example), and the print head PH(2) has ten (=M) nozzles J21 to J2A.

Therefore, in the illustrated example, the print head PH(1) is capable of printing 10 (=M) dots (in the figure, ten black-filled circles represent the ten dots) at a time in the Y-axis direction(sub-scanning direction), and further, as a result of relative scan in the X-axis direction(main scanning direction) with respect to the print medium, the print head PH(1) is capable of printing ten (=M) parallel dot lines L11, L12, and so forth extending in the X-axis direction (represented by horizontally extending black-filled circles in the figure) in a manner juxtaposed in the Y direction. Similarly, the print head PH(2) is capable of printing ten dots (represented by 10 blank circles in the figure) in the direction along the Y axis, and as a result of relative scan in the X-axis direction with respect to the print medium, ten (=M) parallel dot lines L21, L22, and so forth extending in the X-axis direction (represented by horizontally extending blank circles in the figure) in a manner juxtaposed in the Y direction. In short, by using two (=N) print heads each capable of printing ten (=M) dot lines, it is possible in theory to print 20 (M×N) dot lines by one scan, as shown in FIG. 13.

On the other hand, in the image printing apparatus 1, as shown in FIG. 7, the two print heads PH(1), PH(2) are arranged such that L dot lines, where L is a natural number satisfying the relationship L<M (L=2 in the illustrated example), of the ten (=M) dot lines allocated to each of the print heads PH(1), PH(2) overlap each other. More specifically, the two print heads PH(1), PH(2) are arranged such that dot lines L19, L1A allocated to, i.e. to be printed by the print head PH(1) and dot lines L21, L22 allocated to, i.e. to be printed by the print head PH(2) overlap each other.

As a result, these two head groups take charge of (2×M−L=2×10−2=) 18 dot lines, and the printing speed is reduced by a degree corresponding to two (=L) dot lines, i.e. the number of dot lines printable by one scan is decreased by two (=M). Of course, the disadvantageous effect on the printing speed is slight because the actual number M of nozzles is 180. On the other hand, the printing carried out in an overlapping manner makes it possible to prevent degradation of print quality caused e.g. by blank lines appearing between boundaries of the dot lines to be printed by the two print heads PH(1) and PH(2). Needless to say, this applies to boundaries between the other combinations of two print heads (e.g. between PH(2) and PH(3), and between PH(3) and PH(4)), and to the case of use of multiple colors (including other colors than cyan (C)).

More specifically, the L dot lines which cause the problem of degraded print quality are allocated to the two print heads such that these dot lines can be printed in an overlapping or shared manner. Therefore, without necessitating practically impossible positioning accuracy of the nozzles of associated print heads, the print quality can be maintained or enhanced. Therefore, it is possible to increase the printing speed by employing the multi-head structure, and at the same time maintain or enhance the print quality.

Figure 8:
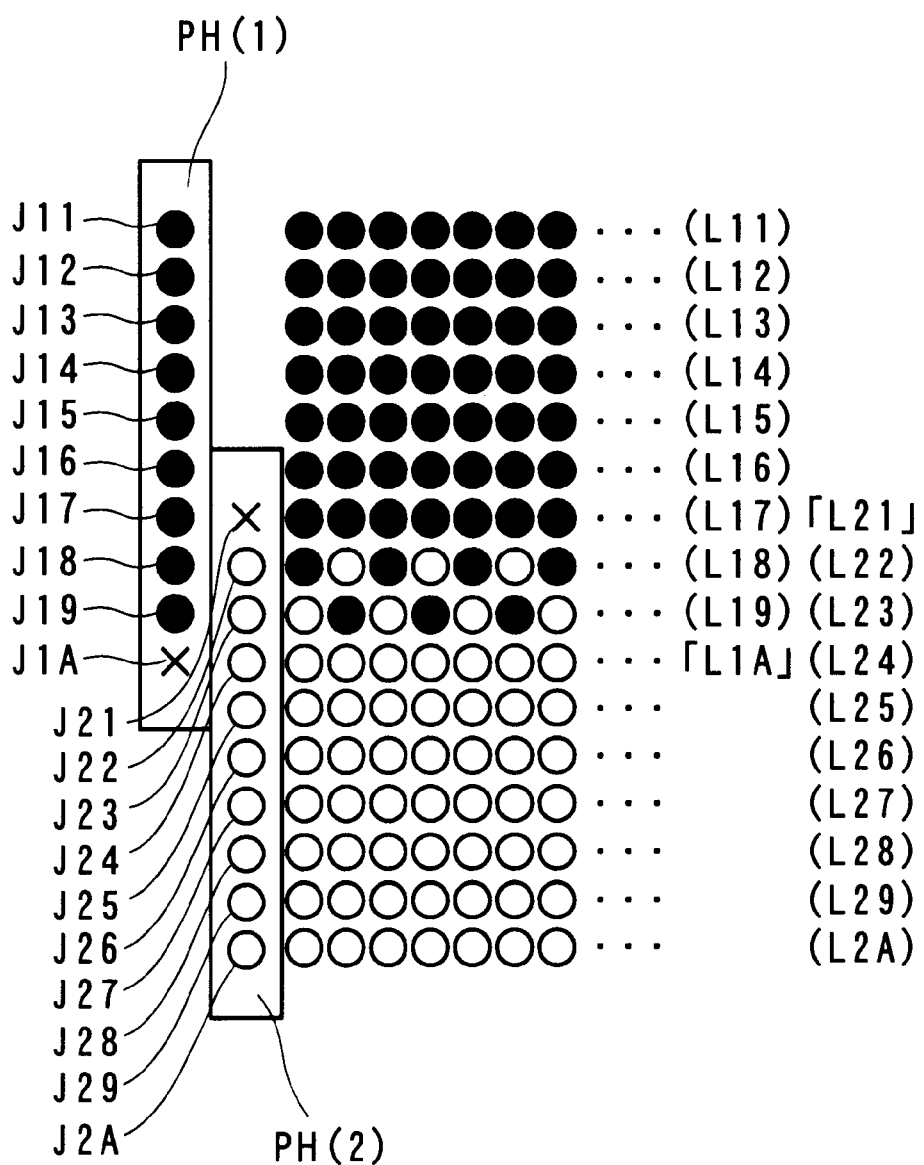
FIG. 8 is an explanatory view similar to FIG. 7, showing another example of dot lines.

Although in the example described above with reference to FIG. 7, the two PH(1), PH(2) of the four (=N) print heads are arranged such that two (=L) dot lines of the 10 (=M) dot lines for which each of the print heads are responsible overlap each other, this is not limitative, but the two print heads may be arranged such that two more extra dot lines, i.e. a total of four dot lines can overlap each other as shown in FIG. 8, and one dot line at a counterpart-side end of the overlapping dot lines is not printed by each responsible one of the print heads, thereby causing two (=L) dot lines to overlap each other. In this case, although the two print heads can each take charge of the four (=L+2) dot lines (L17 to L1A, and L21 to L24) of the overlapping dot lines, only two dot lines (L18 and L19, and L22 and L23) exclusive of one outermost dot line at each counterpart side end are allocated to the two print heads in an overlapping manner. This makes it possible to prevent degradation of print quality due to manufacturing errors of the associated ends of the print heads PH(1), PH(2).

Figure 9:
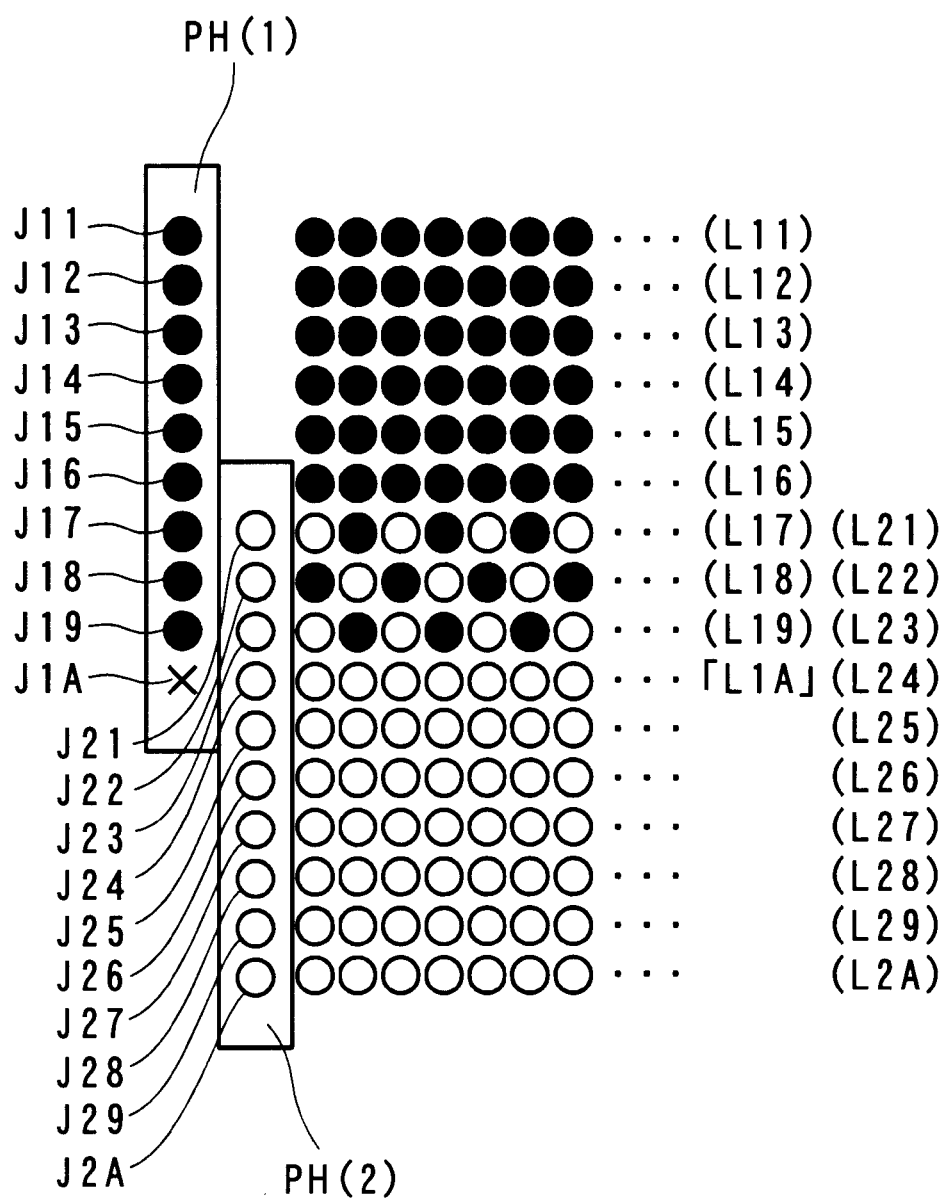
FIG. 9 is an explanatory view similar to FIG. 8, showing still another example of dot lines.

Further, as shown in FIG. 9, the print heads PH(1) and PH(2) may be arranged such that one more extra dot line, i.e. a total of four (=L+1) dot lines overlap over other, and printing of one dot line (corresponding to a cross (X) in the FIG. 9) at a counterpart side end of one of the print heads may be caused to be inhibited, whereby three (=L) dot lines (L17 to L19, and L21 to L23) may be allocated to the two print heads so as to be printed in an overlapping or shared manner. This makes it possible to prevent degradation of print quality due to manufacturing errors of at least the end of one of the print heads PH(1), PH(2).

Although in the examples described in FIGS. 7 to 9, description is given of the case of overlapping printing by the two print heads PH(1), PH(2) of the four (=N) print heads, this can be similarly applied to the other associated ones of the print heads (e.g. PH(2) and PH(2), and PH(3) and PH(4) (see FIG. 6B). Of course, the above overlapping method can be applied not only to all possible associated pairs, but also to part of them. Further, the overlapping printing may be applied not only to associated pairs, but to sets of three or more print heads. For instance, assuming that when the two print heads PH(1), PH(2) are arranged such that L dot lines overlap each other, an additional print head may be arranged such that it is at an intermediate location in the Y direction of the two print heads, i.e. such that the center of the additional print head coincides with the center of the overlapping portions. This enables the three print heads to take charge of the L dot lines in an overlapping or shared manner. In addition, lots of variations of the arrangement of the print heads can be possible when a multi-head structure is employed which uses a large number of print heads, such as 3 by 6 heads of the 18-head configuration mentioned hereinabove.

Further, although in the examples of FIGS. 8 and 9, description is given of a case in which one counterpart side-end dot line (indicated by a cross (X) in the figures) is inhibited from being printed, this is not limitative, but a plurality of lines may be inhibited from being printed. In this case, the FIG. 8 example can be generalized as follows: By arranging print heads such that out of M dot lines, where M represents an integer equal to or larger than 3 (M=10 in the FIG. 8 example), L+2J dot lines, where L is a natural number satisfying the relationship of L≦M−2J, and J is a natural number satisfying the relationship of J<M/2 (in the FIG. 8 example, L=2, and J=1) overlap each other, thereby causing the print heads to take charge of the L dot lines exclusive of J dot lines at respective counterpart side ends, in an overlapping manner. This can prevent degradation of print quality even due to manufacturing errors of associated end portions of the print heads corresponding to the J dots.

Further, the FIG. 9 example can be generalized as follows: By arranging print heads such that out of M dot lines, where M represents an integer equal to or larger than 3 (M=10 in the FIG. 9 example), L+2J dot lines, where L is a natural number satisfying the relationship of L≦M−J, and J is a natural number satisfying the relationship of J<M (in the FIG. 9 example, L=3, and J=1), overlap each other, thereby causing the print heads to take charge of the L dot lines exclusive of J dot lines at a counterpart side end of one print head, in an overlapping manner. This can prevent degradation of print quality even due to manufacturing errors of J dots at an end of one of the print heads.

In these cases, the two print heads PH(1), PH(2) can take charge of L dot lines in an overlapping manner by selectively and alternatively taking charge of dots of each of L dot lines extending in the X-axis direction, such that each dot is printed by an alternately-responsible one of the two print heads.

For instance, in the case of the dot line L19 in FIG. 7 which overlaps the dot line L21, the dots are alternately taken charge of, i.e. printed, such that the first dot is taken charge of, i.e. printed by the print head PH(1), the second dot by the print head PH(2), and so forth, as shown in the figure as "●○●○●○●. . . " extending from a left-side end in FIG. 7. Further, in the case of the next dot line L1A which overlaps the dot line L22, the dots are alternately taken charge of, i.e. printed, such that the first dot is taken charge of, i.e. printed by the print head PH(2), the second dot by the print head PH(1), and so forth, as shown in the figure as "○●○●○●○. . . " extending from a left-side end in FIG. 7. That is, the two print heads take charge of dots in a predetermined order, it is possible to take charge of, i.e. print, the dots of L dot lines in an orderly overlapping manner. This also applies to the examples shown in FIGS. 8 and 9.

It should be noted that assuming that L is a plural, the dots of the plural (=L) overlapping dot lines may be allocated to the print heads such that dots on each dot line in the X-axis direction are alternately taken charge of by the print heads, i.e. dots in a staggered arrangement are taken charge of, i.e. printed by one print head, as shown in 10A, whereby the L dot lines (L=4 in the illustrated example) can be taken charge of by the two print heads in an overlapping manner. Further, as shown in FIG. 10B, similarly to a pattern based on a random number generated for a dithering process, the dots in the X direction may be caused to be randomly taken charge of by the two print heads. In this case, the dots of L (=4, in FIG. 10B) dot lines can be taken charge of in an randomly overlapping manner, whereby the merging portion of respective sets of dot lines allocated to the print heads may be prevented from forming an orderly pattern, thereby further enhancing print quality.

Now, in the image printing apparatus 1, as described hereinabove with reference to FIGS. 1 and 4, the print image data generated by the image forming system WS0 can be received via the first interface If1. In doing this, the image forming system WSO sends out print image data in units of line data each representative of one line via the first interface IF1 to the image printing apparatus 1.

In the image printing apparatus 1, when each line data is received by the image data I/O 26, the line data is transmitted to the head control block 60 via the internal bus 80. When the head control block 60 has received the line data, the head control block 60 stores the line data, based on information as to a position of the received data in the print image and a designated color (gradation value of a designated color) (given by a command from the CPU 21 or determined by itself), in a corresponding image buffer of one of the head control blocks (e.g. in the image buffer 6111 of the first head control block 61).

Let it be assumed here that as shown in FIG. 11A, out of the print image data received via the image data I/O 26, e.g. a portion to be printed only by the head nozzles 6113 of the first head control block 61 is represented by image data D11, a portion to be printed only by the head nozzles 6213 of the second head control block 62 corresponding to the head nozzles 6113 by image data D22, and a portion to be taken charge of in an overlapping or shared manner by the first and second control blocks 61, 62 by image data D12, and that the received print image data is once stored in a temporary image buffer 6011. In this case, data are stored in an image buffer 6111 for the head nozzle 6113 and an image buffer 6211 for the head nozzle 6213 (of the second print head block 62 corresponding to the image buffer 6111) as shown in FIG. 11B.

That is, in the above example, the image data D12 corresponds to the L dot lines (overlapping dot lines). Therefore, the image printing apparatus 1 determines an allocation pattern which defines the manner of allocating of dots of L dot lines each extending in the X-axis direction to the two print heads (e.g. print heads PH(1), PH(2), see FIGS. 7 to 9) by a pattern. The manner of determination (i.e. allocation) can be orderly or random, as described hereinabove (see FIGS. 10A and 10B). Further, the pattern may be determined immediately before the use thereof according to a predetermined control program which makes use of generation of a random number. Alternatively, the pattern may be provided in advance as the allocation pattern.

For instance, the allocation pattern for allocating dots of overlapping dot lines to the two print heads PH(1), PH(2) may be provided in advance as a first mask pattern MK1 and a second mask pattern MK2 which is an inversion to the first mask pattern (in the illustrated example, black-filled rectangles represent 1 (ON), while hollow rectangles represent 0 (OFF)). By calculating a logical product (AND) of the image data D12 within the respective image buffers 6111, 6112 and the respective first and second mask patterns MK12 and MK2, print data having the allocation of dots of the overlapping portion incorporated therein can be prepared.

Now, as shown in FIG. 12B, assuming that the image data D12 of the overlapping portion in which the allocation of dots to the first print head PH(1) has been reflected is image data D12(1), with the sum of the image data D11 + image data D12(1) being print data D1 for the first print head PH(1), and similarly, the image data D12 of the overlapping portion in which the allocation of dots to the second print head PH(2) has been reflected is image data D12(2), with the sum of the image data D22 + image data D12(2) being print data D2 for the second print head PH(2), the states of data in image buffers before and after the above processing (allocation) can be illustrated as shown in FIGS. 12A and 12B, respectively.

In the image printing apparatus 1, arbitrary two print heads (e.g. print heads PH(1), PH(2)) carry out printing according to print data representing respective M dot lines to be printed by them. In this case, as shown in FIGS. 12A, 12B, in the print data (e.g. D1, D2) corresponding to the respective print heads (e.g. PH(1), PH(2)), there is reflected information concerning each dot as to whether the dot should be taken charge of i.e. printed by a corresponding one of the print heads, and hence it is possible to print dots allocated to the print heads simply by carrying out printing according to the print data.

Further, in the image printing apparatus, an allocation pattern which allocates dots of L dot lines extending in the X-axis direction to the two print heads (e.g. PH(1), PH(2)), and based on the allocation pattern, first print data (e.g. D1) corresponding to the first print head (e.g. PH(1)) and second print data (e.g. D2) corresponding to the second print head (e.g. PH(2)) are stored. Therefore, the two print heads (e.g. PH(1), PH(2)), can print dots to be printed thereby simply by carrying out printing according to the print data (e.g. D1 and D2).

Further, in the example described hereinabove with reference to FIGS. 11A and 11B, pseudo first print image data D1S (=image data D11 + image data D12) which represents M dot lines to be printed by the first print head PH(1) assuming that the M dot lines (more particularly, L dot lines) do not overlap L dot lines to be printed by the second print head PH(2), and a first mask pattern MK1 indicative of dots to be printed by the first print head PH(1) is prepared based on the allocation pattern (or prepared and stored in advance). Then, masking of the data (image data D12) of the L dot lines out of the pseudo first print data D1S is carried out based on the first masking pattern MK1, to thereby convert the pseudo first print data D1S to the first print data D1, and store the same, as shown in FIG. 12B.

That is, by using the first masking pattern MK1, the pseudo first print data D1S is converted to the first print data D1. Therefore, the first print data D1 can be easily formed e.g. by once storing the pseudo first print data, and then performing the data conversion after determining allocation of each dot to a print head. This can be also performed for the second print data, similarly by converting pseudo second print data to the second print data D2 by using a second masking patter MK2.

As a result, as shown in FIG. 12B, the image printing apparatus 1 stores print data (first individual print data) D11 representing M−L dot lines which dot not overlap but are to be printed by the first print head PH(1) alone, print data (first common print data) D12(1) representing the L dot lines which overlap the L dot lines to be printed by the second print head PH(2) and are to be printed by the first print head PH(1), print data (second individual print data) D22 representing M−L dot lines which dot not overlap but are to be printed by the second print head PH(2) alone, and print data (second common print data) D12(1) representing the L dot lines which overlap the L dot lines to be printed by the first print head PH(1) and are to be printed by the second print head PH(2).

Therefore, differently from the example shown in FIGS. 11A, 11B, without causing the pseudo first print data DS1 and the second pseudo print data DS2 to be stored, it is possible to store the first and second print data while determining allocation of dots to the first print head and the second print head. In this case, out of the print image data received via the image data I/O 26, which are described hereinabove with reference to FIGS. 11A or 12A, the image data D12 which are to be printed in an overlapping manner, i.e. print data (basic common print data) D12 representing the L dot lines in which the allocation of the dots of the L dot lines to the first print head and the second print head has not been reflected is allocated to or divided between the print data (first common print data) D12(1) and the print data (second common print data) D12(2) based on the allocation pattern. Therefore, by adding the data (first individual print data) D11 and the data (second individual print data) D22 to the first common print data and the second common print data, respectively, it is possible to easily form the first print data D1 and the second print data D2.

Although in the above embodiment, the print data D1, D2 are formed by the image printing apparatus 1, this is not limitative, but the processing up to the allocation as shown in FIG. 12B may be carried out by the image forming system WS0. Further, the print image to be printed by the image printing system PSYS is a color image, and the print image data contains binary data which represents execution and inhibition of printing of each dot of the print image by binary expression e.g. based on a dithering process according to a printing density (resolution, graduation of print, etc.), for each color, that is, the print image data is transmitted as binary data. Therefore, even if the print image is a color image, it can be easily printed by allocating the binary data to the N print heads PH(1) to PH(4).

Further, in the image printing system PSYS, the image printing system (or apparatus) WS0 forms image print data representing a desired print image, and sequentially transmits each line data of the formed print image data via the first interface IF1. The image printing apparatus 1 on the data-receiving side receives each line data, and prints on the print medium (tape T) in the direction along the X axis. Therefore, by enhancing the parallelism of communication of the print image data and printing of the print image, it is possible to increase the printing speed while transmitting the print image data via the first interface IF1. Further, the print medium is in a continuous form (tape T), and mounted in the printing apparatus such that the direction along the length of the print medium coincides with the X-axis direction. This makes it possible to increase the amount of data to be printed per scan to thereby further increase the printing speed.

Here, it is preferred that the first interface IF1 enables communication in conformity to any of the interface standards of RS-232C, USB (Universal Serial Bus), Centronics, etc. Therefore, in the image printing apparatus 1, the image data I/O 26 described above with reference to FIG. 4 is compatible with the above interface standards (including interfaces conforming to any of these standards). Needless to say, the image forming system (device) WSO, which has a personal computer, an EWS, or the like, is compatible with these typical standards so that the system WSO can perform communications in conformity to the standards via the first interface IF1. It goes without saying that the first interface IF1 can be one enabling wireless communication.

Further, as shown in FIG. 1, in the image printing system PSYS, it is also possible to configure the image forming system WSO such that it is comprised of (or replaced by) a work station WS2 having a personal computer, EWS or the like for use in designing print images, and a work station WS1 having a personal computer or the like for outputting print line data.

In this case, the work station WS2 prepares print image data representing a desired print image, and the formed print image data is transmitted via the second interface IF2. On the other hand, the work station WS1 divides the received print image data into line data, and sequentially sends the line image data one by one via the first interface IF1. Then, the image printing apparatus 1 performs printing based on each line data in the X-axis direction of the tape (print medium). Therefore, in this case as well, by enhancing the parallelism of communication and printing, it is possible to increase the printing speed as a whole, and by increasing the amount of data to be printed per scan, it is possible to further increase the printing speed.

In this embodiment, it is preferred that the second interface IF2 enables communication via a predetermined network. For instance, when the predetermined network includes the Internet and a predetermined local area network (LAN), the second interface IF2 enables communication via the predetermined network including the Internet and the predetermined LAN. Further, it is preferred that the second interface IF2 is capable of communication based on the communication protocol conforming to IEEE standard LAN, and capable of communication conforming to at least one of data link protocol of the Ethernet, FDDI, and ATM. It should be noted that in addition to the above data link protocols, those of Token Ring, 100VG-Any LAN, Fiber Channel, HIPPI (High Performance Parallel Interface), IEEE1394 (Fire Wire), and so forth can be used. It goes without saying that the second interface IF2 can employ wireless communication according to at least one of the protocols.

Although in the embodiment described above, the invention is applied to the printing apparatus of ink jet type, which uses N print heads each having M nozzles capable of printing M dots by ink ejected from the M nozzles, this is not limitative, but it may be also applied to a printing apparatus of thermal type which has the multi-head structure using N print heads, whereby the printing speed can be increased while maintaining or increasing the print quality.

It is further understood by those skilled in the art that the foregoing is a preferred embodiment of the invention, and that various changes and modifications may be made without departing from the spirit and scope thereof.

What is claimed is:

1. A printing apparatus for printing on a print medium by using N print heads, where N is an integer equal to or larger than 2, assuming that two axes orthogonal to each other on a two-dimensional rectangular coordinate system are set to an X axis and a Y axis, each of the print heads being capable of simultaneously printing M dots in a direction along the Y axis, where M is an integer equal to or larger than 3, and also being capable of printing M dot lines each extending in a direction along the X axis, by relative scan on the print medium in the direction along the X axis, the M dot lines being arranged side by side in the direction along the Y axis, at least two print heads among the N print heads being disposed such that selected ones of a first set of M dot lines printable by one of the at least two print heads overlap selected ones among a second set of M dot lines printable by another of the at least two print heads, wherein L dot lines of the first set of M dot lines overlap L dot lines of the second set of M dot lines, where L is a natural number satisfying the relationship of L<M; and wherein said apparatus comprises control means for inhibiting at least one of the print heads from printing J dot line at a counterpart print head side end, where J is a natural number satisfying the relationship of J<M/2.

2. A printing apparatus according to claim 1, wherein at least two print heads are arranged in a manner such that L+2J dot lines of the first set of M dot lines overlap L+2J dot lines of the second set of M dot lines, where L is a natural number satisfying the relationship of L≦M−2J.

3. A printing apparatus according to claim 1, wherein at least two print heads are arranged in a manner such that L+J dot lines of the first set of M dot lines overlap L+J dot lines of the second set of M dot lines, where L is a natural number satisfying the relationship of L≦M−J, and J is a natural number satisfying the relationship of J<M.

4. A printing apparatus according to claim 3, wherein said control means controls such that the at least two print heads alternatively print each of dots of the L dot lines each extending along the X axis.

5. A printing apparatus according to claim 4, wherein said control means controls such that the at least two print heads print the dots of the L dot lines in a predetermined order.

6. A printing apparatus according to claim 5, wherein said control means controls such that the at least two print heads alternately print each of the dots of the L dot lines.

7. A printing apparatus according to claim 6, wherein the L is a plural number, and wherein said control means controls such that each of the at least two print heads print the dots of the L dot lines in a staggered arrangement.

8. A printing apparatus according to claim 4, wherein said control means controls such that the at least two print heads print the dots of the L dot lines in a random order.

9. A printing apparatus according to claim 4, wherein the at least two print heads perform printing based on print data representing the M dot lines to be printed thereby, and wherein each item of the print data based on which a corresponding one of the at least two print heads performs printing contains information concerning each dot as to whether the dot should be printed by the corresponding one of the at least two print heads.

10. A printing apparatus according to claim 9, wherein the at least two print heads comprise a first print head and a second print head, and wherein the printing apparatus further comprises:
allocation pattern-determining means for determining an allocation pattern which defines a manner of allocation of the dots of the L dot lines to the at least two print heads by a pattern,
first print data-storing means for storing first print data representing M dot lines to be printed by the first print head, based on the allocation pattern, and
second print data-storing means for storing second print data representing M dot lines to be printed by the second print head, based on the allocation pattern.

11. A printing apparatus according to claim 10, wherein the first print data-storing means comprises:
pseudo first print data-storing means for storing pseudo first print data representing M dot lines to be printed by the first print head assuming the L dot lines to be printed by the first print head do not overlap the L dot lines to be printed by the second print head,
first mask pattern-forming means for forming a first mask pattern indicative of part to be printed by the first print head based on the allocation pattern, and
first print data-forming means for converting the pseudo first print data to the first print data by carrying out masking of data of the L dot lines out of the pseudo first print data based on the first mask pattern.

12. A printing apparatus according to claim 10, wherein the first print data-storing means comprises:
first individual print data-storing means for storing first individual print data representing, out of the M dot lines to be printed by the first print head, M−L dot lines which dot not overlap the L dot lines to be printed by the second print head,
first common print data-storing means for storing first common print data representing, out of the M dot lines to be printed by the first print head, the L dot lines which overlap the L dot lines to be printed by the second print head, and wherein the second print data-storing means comprises:
second individual print data-storing means for storing second individual print data representing, out of the M dot lines to be printed by the second print head, M−L dot lines which dot not overlap the L dot lines to be printed by the first print head,
second common print data-storing means for storing second common print data representing, out of the M dot lines to be printed by the second print head, the L dot lines which overlap the L dot lines to be printed by the first print head, and
wherein the printing apparatus further comprises:
basic common print data-storing means for storing basic common print data representing the L dot lines in which the allocation of the dots of the L dot lines to the first print head and the second print head has not been reflected, and
common print data-allocation means for allocating the basic common print data to the first common print data and the second common print data based on the allocation pattern.

13. A printing apparatus according to claim 1, wherein the N print heads are each formed by an ink jet print head having at least M nozzles each for ejecting ink, the ink jet print head being capable of printing the M dots simultaneously by ink ejected from the M nozzles.

14. A printing apparatus according to claim 1, including print image data-storing means for storing print image data representing a print image to be printed on the print medium, and wherein the print image data contains binary data representing execution and inhibition of printing of each dot by binary expression.

15. A printing apparatus according to claim 14, wherein the print image is a color image, and wherein the print image data contains binary data representing each color of the color image.

16. A printing apparatus according to claim 1, wherein the print medium is in a continuous form, and mounted in the printing apparatus such that a direction along length of the print medium coincides with the direction along the X axis.

* * * * *